United States Patent
Takano et al.

(10) Patent No.: US 10,002,264 B2
(45) Date of Patent: Jun. 19, 2018

(54) STORAGE DEVICE AND METHOD FOR LOCATION BASED PROTECTION OF DATA IN A PORTABLE STORAGE DEVICE

(71) Applicant: FUJITSU LIMITED, Kawasaki-shi, Kanagawa (JP)

(72) Inventors: Ayumi Takano, Kawasaki (JP); Toru Irisawa, Kawasaki (JP); Shigeru Ikushima, Kawasaki (JP); Takuma Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 536 days.

(21) Appl. No.: 14/094,424

(22) Filed: Dec. 2, 2013

(65) Prior Publication Data

US 2014/0173237 A1 Jun. 19, 2014

(30) Foreign Application Priority Data

Dec. 14, 2012 (JP) .................................. 2012-273628

(51) Int. Cl.
*G06F 12/14* (2006.01)
*G06F 21/79* (2013.01)

(52) U.S. Cl.
CPC .............. *G06F 21/79* (2013.01); *G06F 12/14* (2013.01); *G06F 12/1458* (2013.01); *G06F 2221/2111* (2013.01)

(58) Field of Classification Search
CPC ...... G06F 21/79; G06F 12/1458; G06F 12/14; G06F 2221/2111
See application file for complete search history.

(56) References Cited

U.S. PATENT DOCUMENTS

| 6,985,588 | B1* | 1/2006 | Glick | G06F 21/10 380/258 |
| 2002/0051540 | A1* | 5/2002 | Glick | G06F 21/10 380/258 |
| 2003/0108202 | A1* | 6/2003 | Clapper | H04L 9/0872 380/258 |
| 2007/0101438 | A1* | 5/2007 | Govindarajan | G06F 21/6218 726/27 |
| 2007/0168294 | A1 | 7/2007 | Tsurukawa | |

FOREIGN PATENT DOCUMENTS

| JP | 2007-094851 A | 4/2007 |
| JP | 2010-287002 A | 12/2010 |
| WO | 2005/064484 A1 | 7/2005 |

* cited by examiner

*Primary Examiner* — Arpan P. Savla
(74) *Attorney, Agent, or Firm* — Maschoff Brennan

(57) ABSTRACT

A storage device includes a memory including a first storage area configured to store area information that indicates a geographical area, and a second storage area configured to store data, and a processor coupled to the memory and configured to append data storage information, which indicates a location of the storage device, to the data to be stored in the second storage area, and allow a piece of the data stored in the second storage area to become available, the piece having the data storage information indicating that the location of the storage device falls within an area indicated by the area information, while the storage device is located within the area indicated by the area information.

12 Claims, 9 Drawing Sheets

REGISTER NEW AREA INFORMATION

AREA NAME [                    ] ~301

AREA INFORMATION

STARTING LATITUDE [    302    ]   ENDING LATITUDE [    303    ]
STARTING LONGITUDE [    304   ]   ENDING LONGITUDE [    305   ]
STARTING ALTITUDE [    306    ]   ENDING ALTITUDE [    307    ]

[ CANCEL ]    [ CLEAR ]    [ SAVE ]

STORAGE DEVICE AND METHOD FOR LOCATION BASED PROTECTION OF DATA IN A PORTABLE STORAGE DEVICE

CROSS-REFERENCE TO RELATED APPLICATION

This application is based upon and claims the benefit of priority of the prior Japanese Patent Application No. 2012-273628, filed on Dec. 14, 2012, the entire contents of which are incorporated herein by reference.

FIELD

The embodiments discussed herein are related to storage devices, and methods for protecting data in the storage devices.

BACKGROUND

When carrying out maintenance work on personal computers (PCs) or the like, there are cases where a maintenance technician adjusts the PCs for a client who holds a maintenance contract. To date, at the time of field service and maintenance work on the PCs, the maintenance technician temporarily stores, in an external storage device such as a universal serial bus (USB) memory, information that is stored in the PCs. Then, upon completing the maintenance work, the maintenance technician deletes the data stored in the storage device.

A variety of measures are being taken to block leakage of data in order to protect data in a storage device. Such measures include data encryption, setting a password on the data, and biometric authentication. According to a technique discussed in Japanese Laid-open Patent Publication No. 2010-287002, a user registers in advance in a physical server a location in which the user uses a storage medium such as a USB memory, and thus usage of the storage medium that is carried around among multiple locations is managed.

Such techniques are discussed, for example, in Japanese Laid-open Patent Publication No. 2010-287002.

SUMMARY

According to an aspect of the invention, a storage device includes a memory including a first storage area configured to store area information that indicates a geographical area, and a second storage area configured to store data, and a processor coupled to the memory and configured to append data storage information, which indicates a location of the storage device, to the data to be stored in the second storage area, and allow a piece of the data stored in the second storage area to become available, the piece having the data storage information indicating that the location of the storage device falls within an area indicated by the area information, while the storage device is located within the area indicated by the area information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 schematically illustrates a dialog box to be used for configuring area information settings in the first embodiment;

DESCRIPTION OF EMBODIMENTS

With the existing technique, there is a risk that the maintenance technician may fail to delete the data that has been stored in the storage device. If the maintenance technician fails to delete the data prior to carrying out maintenance work on another client's PCs using the same storage device, there is a risk that the maintenance technician may accidentally decrypt the data which the maintenance technician has failed to delete and then carry out maintenance work on the other client's PCs. Thus, there is still a risk that the information may leak, which may cause a client trouble. Further, the method in which the location where the USB memory is used is registered in advance in the physical server does not allow flexible management, which increases the load on the user.

Hereinafter, a storage device, a method for protecting data in the storage device, and a program according to an embodiment will be described in detail with reference to the drawings.

Figure 1A:
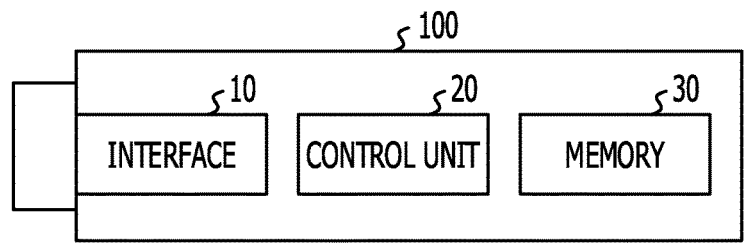
FIG. 1A schematically illustrates a configuration of a portable medium according to a first embodiment, and FIG. 1B schematically illustrates a configuration of a data protection system for the portable medium according to the first embodiment.

FIG. 1A schematically illustrates a configuration of a portable medium 100 according to a first embodiment. In the first embodiment, the portable medium 100 serves as an example of the storage device. As illustrated in FIG. 1A, the portable medium 100 includes an interface 10, a control unit 20, and a memory 30. The interface 10 serves as a connection through which the portable medium 100 is connected to a host, which is an external device. The control unit 20 controls each unit in the portable medium 100 to carry out various processes. The control unit 20 is a one-chip microcomputer or the like that includes, for example, a central processing unit (CPU), a program controller, and a program storage unit. The memory 30 serves as a storage area for data transmitted from the host to be stored in the portable medium 100. The memory 30 also stores various pieces of data in various processes in the portable medium 100. These units and processes will be described later in further detail. Examples of the portable medium 100 include a USB device that includes a USB controller. Examples of the USB controller include a USB target controller that includes a one-chip microcomputer having a memory.

Figure 1B:
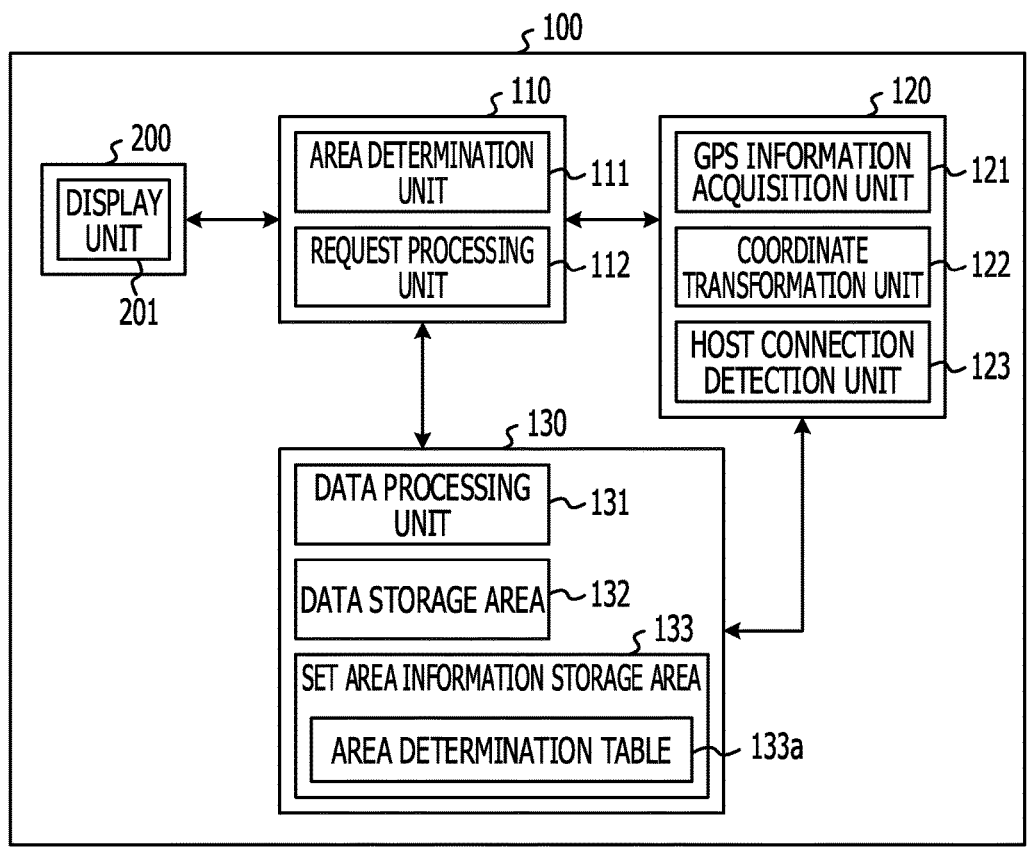

FIG. 1B schematically illustrates a configuration of a data protection system 1 for implementing the method for protecting data in the portable medium 100 according to the first embodiment.

The data protection system 1 includes the portable medium 100 and a PC 200, which can be connected to the portable medium 100. The PC 200 is an example of the host. It is to be noted that any given PC can be selected as the host to which the portable medium 100 is connected when a maintenance technician (user) carries out maintenance work. However, for reasons of convenience, the assumption in the first embodiment is that the user brings the portable medium 100 and the PC 200 to a client who holds a maintenance contract and connects the portable medium 100 to the PC 200 to carry out maintenance work. Examples of the portable medium 100 may include a USB memory, and examples of the PC 200 may include a notebook PC.

As illustrated in FIG. 1B, the portable medium 100 includes a main control unit 110, an authentication unit 120, and a data management unit 130. The main control unit 110 includes an area determination unit 111 and a request processing unit 112. The authentication unit 120 includes a GPS information acquisition unit 121, a coordinate transformation unit 122, and a host connection detection unit 123. The data management unit 130 includes a data processing unit 131, a data storage area 132, and a set area information storage area 133. These units and areas will be described later in further detail.

When the portable medium 100 is connected to the PC 200, the main control unit 110 cooperates with the authentication unit 120 and the data management unit 130 to control execution of various processes related to data protection that is to be carried out in the portable medium 100. The area determination unit 111 transforms GPS information data acquired by the GPS information acquisition unit 121 into coordinates. In addition, the area determination unit 111 determines, on the basis of the coordinates, whether or not the portable medium 100 is located within an area in which data stored in the data storage area 132 is available. The request processing unit 112 receives a request that is transmitted from the PC 200 to the portable medium 100. Then, the request processing unit 112 carries out processing such as reading and writing of data stored in the data storage area 132 in accordance with the received request.

Under the control of the main control unit 110, the authentication unit 120 acquires GPS information from GPS satellites, transforms the acquired GPS information into coordinates indicating a current location of the portable medium 100, and detects a connection between the portable medium 100 and the PC 200. The GPS information acquisition unit 121 acquires positioning information from a plurality of GPS satellites. The acquired positioning information is transmitted to the area determination unit 111 and the coordinate transformation unit 122. The coordinate transformation unit 122 transforms the positioning information transmitted from the GPS information acquisition unit 121 into coordinates of latitude, longitude, and altitude. The transformed coordinates are transmitted to the data management unit 130 as current location information. The host connection detection unit 123 detects whether or not the portable medium 100 is connected to the PC 200 serving as the host.

The data management unit 130 encrypts or decrypts the data received from the PC 200. In addition, the data management unit 130 appends, to the data, the current location information transmitted from the coordinate transformation unit 122. Furthermore, the data management unit 130 stores area information received from the PC 200. The data processing unit 131 encrypts or decrypts the data received from the PC 200. As will be described later, an encryption key and a decryption key to be used for encrypting and decrypting the data are stored in file/folder management information. The data storage area 132 stores the data and so on received from the PC 200. The set area information storage area 133 stores set area information. The set area information is an example of area information regarding an area in which the data stored in the data storage area 132 becomes available. In the first embodiment, the set area information storage area 133 corresponds to a first storage area, and the data storage area 132 corresponds to a second storage area.

Figure 2:
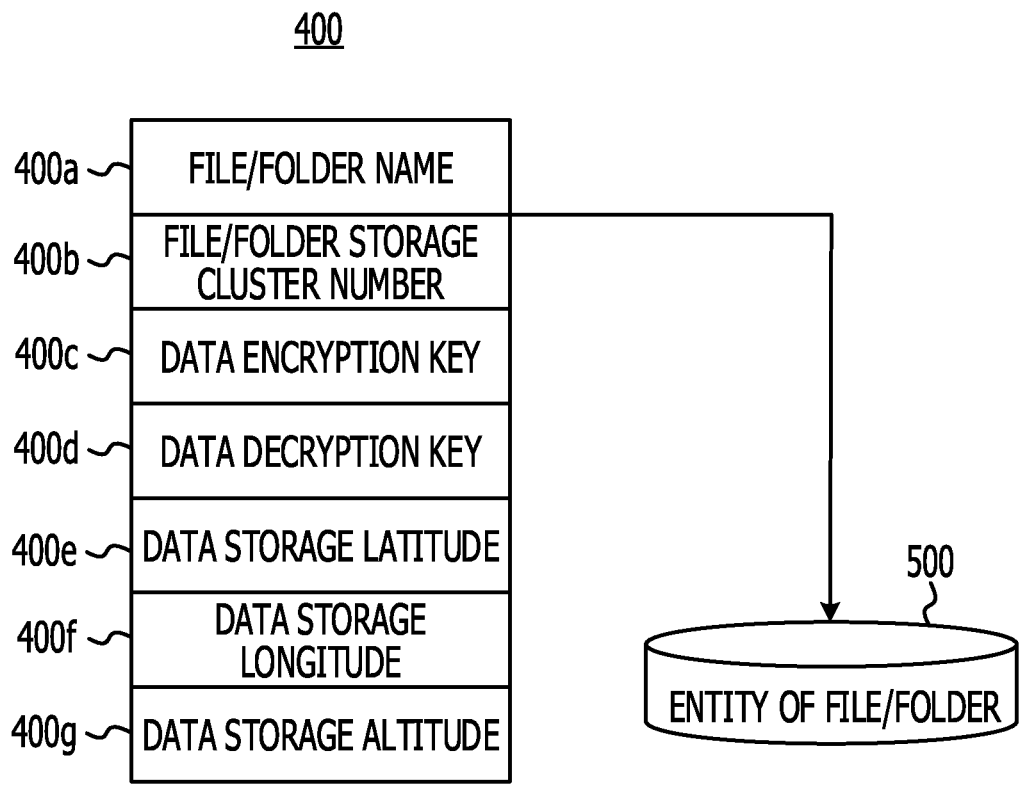
FIG. 2 schematically illustrates a data structure of the portable medium according to the first embodiment.

FIG. 2 illustrates the structure and the content of management information on a file or a folder serving as an example of the data to be stored in the data storage area 132 of the portable medium 100 in the first embodiment. When a user saves a file or a folder in the portable medium 100, file/folder management information 400 illustrated in FIG. 2 is created in order to manage the file or the folder. The file/folder management information 400 includes basic information on the file or the folder. This basic information includes a file/folder name 400a and a file/folder storage cluster number 400b, which is a cluster number at which the file or the folder is stored. In addition, the file/folder management information 400 includes a data encryption key 400c and a data decryption key 400d, which are used respectively to encrypt and decrypt the file or the folder, a data storage latitude 400e, a data storage longitude 400f, and a data storage altitude 400g. The data storage latitude 400e, the data storage longitude 400f, and the data storage altitude 400g are examples of data storage information in the first embodiment. In the first embodiment, an entity 500 of the file or the folder is stored in the data storage area 132 separately from the file/folder management information 400. The entity 500 of the file or the folder is referred to in accordance with the file/folder name 400a and the file/folder storage cluster number 400b, which form the basic information in the file/folder management information 400.

The data processing unit 131 creates the encryption key and the decryption key. When the data is encrypted, the GPS information acquisition unit 121 acquires the positioning information. Then, the coordinate transformation unit 122 transforms the positioning information into the coordinates of latitude, longitude, and altitude. Thereafter, the data processing unit 131 acquires the transformed coordinates and adds the acquired coordinates to the file/folder management information 400 as the data storage latitude 400e, the data storage longitude 400f, and the data storage altitude 400g.

Figure 5:
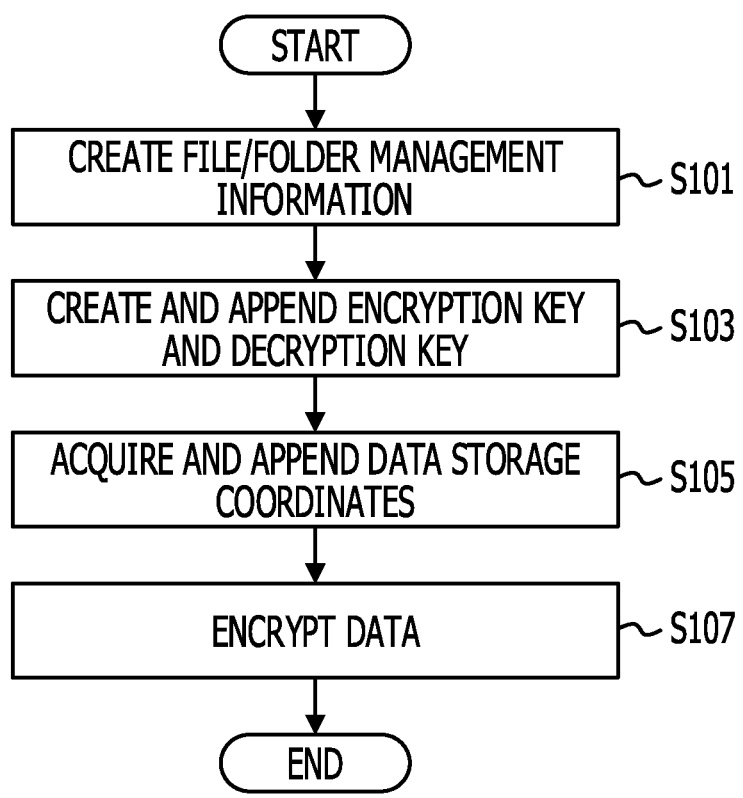
FIG. 5 is a flowchart of processing for storing data in the portable medium according to the first embodiment.

FIG. 5 is a flowchart of processing for storing data in the data storage area 132 in the first embodiment. For reasons of convenience, the assumption here is that the data will be newly stored in the data storage area 132. In addition, the assumption is that, prior to carrying out the processing in this flowchart, the portable medium 100 is connected to the PC 200, processing such as authentication processing has been completed, and thus the portable medium 100 is in a state in which data can be stored therein. Processing such as the authentication processing will be described later in further detail.

The main control unit 110 starts the processing in the flowchart when the data is to be stored in the data storage area 132. The main control unit 110 controls each unit in the portable medium 100 to proceed with the processing in the flowchart. First, in S101, the data processing unit 131 creates file/folder management information 400 on the data to be stored. The file/folder management information 400 created in S101 includes a file/folder name 400a and a file/folder storage cluster number 400b, which are basic information. Then, the processing proceeds to S103.

In S103, the data processing unit 131 creates an encryption key and a decryption key, which are used to encrypt and decrypt the data to be stored. Then, the data processing unit 131 appends the created encryption key and decryption key to the file/folder management information 400, which has been created in S101, as a data encryption key 400c and a data decryption key 400d, respectively. As will be described later, the data becomes available or unavailable in accordance with set area information that is stored in the set area information storage area 133. Therefore, in S103, the data processing unit 131 may create the encryption key and the decryption key in accordance with the set area information in which the data becomes available. Then, the processing proceeds to S105.

In S105, the GPS information acquisition unit 121 acquires positioning information from a plurality of GPS satellites. In addition, the coordinate transformation unit 122 transforms the positioning information into coordinates of latitude, longitude, and altitude. Then, the data processing unit 131 acquires the transformed coordinates and appends, as data storage information, the latitude, the longitude, and the altitude indicated in the coordinates, respectively, to a data storage latitude 400e, a data storage longitude 400f, and a data storage altitude 400g of the file/folder management information 400. Then, the processing proceeds to S107. In S107, the data processing unit 131 encrypts the data using the encryption key that is stored in the data encryption key 400c. As the encryption of the data is completed, the main control unit 110 ends the data storage processing.

Although a case where the data is newly stored in the data storage area 132 has been described above, similar processing is carried out even in a case where existing data is overwritten in the data storage area 132. What differs in such a case from the one described above is that the file/folder management information 400 already holds the basic information, the encryption key, the decryption key, the data storage latitude, the data storage longitude, and the data storage altitude in S101. Another difference lies in that each piece of the information above is updated using information created in S103 and S105.

Subsequently, operations for setting the area information that defines an area in which the data is available according to the first embodiment will be described. In the first embodiment, prior to the maintenance work, the user sets an area in which the data to be stored in the portable medium 100 is available. FIG. 3 illustrates an area information setting dialog box 300 to be used when configuring the area information settings in the first embodiment. Data on the area information setting dialog box 300 is stored in a memory (not illustrated) of the data management unit 130. While the portable medium 100 is connected to the PC 200, the main control unit 110 receives a request for the area information settings from the PC 200. Then, the main control unit 110 acquires the data on the area information setting dialog box 300 from the data management unit 130 and transmits the data to the PC 200. The PC 200 in turn displays the area information setting dialog box 300 in a display unit 201 in accordance with the received data.

As illustrated in FIG. 3, the area information setting dialog box 300 includes an area name input box 301 for inputting a name of area information to be set and area information input boxes 302 to 307 for defining an area to be set. The area to be set is defined by a starting latitude, an ending latitude, a starting longitude, an ending longitude, a starting altitude, and an ending altitude. The user inputs values in the respective area information input boxes 302 to 307. Thus, the set area that defines a space of a predetermined range is determined on the basis of the inputted values. Once the user finishes inputting the various pieces of information in the area information setting dialog box 300, the user presses a "save" button. Then, the pieces of data inputted in the respective boxes 301 to 307 are transmitted to the portable medium 100 as the set area information. As the portable medium 100 receives the data on the set area information, the request processing unit 112 stores the received data in the set area information storage area 133. When the request processing unit 112 stores the set area information in the set area information storage area 133, the data is encrypted by the data processing unit 131.

Figure 4:
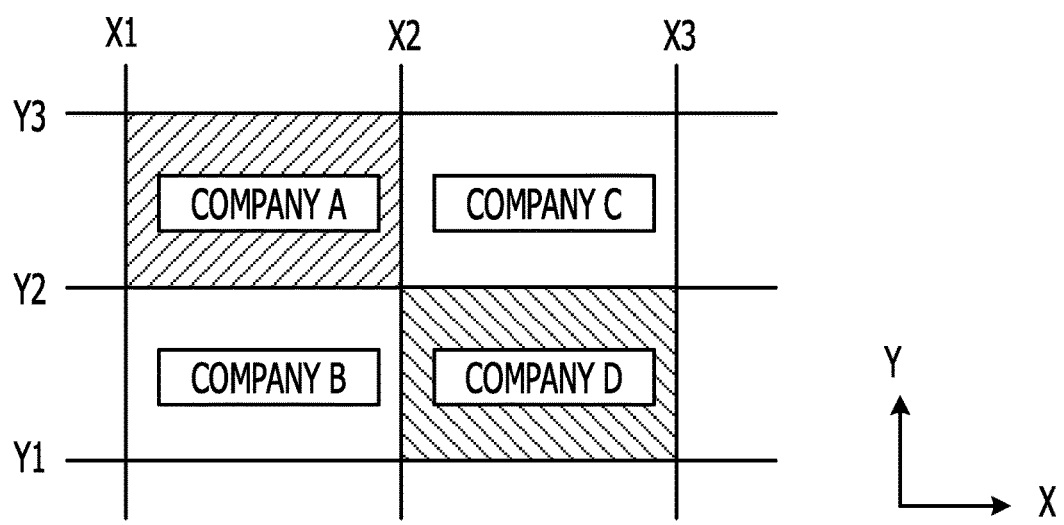
FIG. 4 is a two-dimensional map for describing the area information settings in the first embodiment.

Here, the configuration of the area information settings in the first embodiment will be described in detail with a specific example. FIG. 4 schematically illustrates a two-dimensional map serving as an example of work sites in which maintenance work is carried out using the portable medium 100 in the first embodiment. As illustrated in FIG. 4, the user carries out maintenance work at companies A, B, C, and D that are each located in a distinct location. In the first embodiment, as illustrated in FIG. 4, the user sets the coordinates along the X-axis and the Y-axis that are orthogonal to each other. The X-coordinate indicates the longitude in the two-dimensional map, and the Y-coordinate indicates the latitude. Rectangular areas are defined by X-coordinates X1 to X3 and Y-coordinates Y1 to Y3 such that each of the rectangular areas contains a corresponding one of the companies A, B, C, D.

For example, suppose the user, using the portable medium 100, carries out maintenance work at the company A on one day and at the company D on the following day. In this case, in order to configure the area information settings prior to arriving at the company A, the user connects the portable medium 100 to the PC 200 at any given location. Then, the user starts, for example, an application for configuring the area information settings in the PC 200 in order to transmit a request for configuring the area information settings to the portable medium 100. The PC 200 in turn receives the data on the area information setting dialog box 300 from the portable medium 100. Thus, the area information setting dialog box 300 is displayed in the display unit 201.

The user inputs in the area name input box 301 of the displayed area information setting dialog box 300, for example, a name such as "data storage area for the company A" to indicate that the area setting information is for the company A. Further, the user inputs the latitudes and the longitudes in the respective input boxes 302 to 305 to specify an area that contains the company A. For example, as illustrated in FIG. 4, the user inputs the values of the X-coordinate X1 as the starting latitude, the X-coordinate X2 as the ending latitude, the Y-coordinate Y2 as the starting longitude, and the Y-coordinate Y3 as the ending longitude in the respective input boxes 302 to 305 of the area information setting dialog box 300. Note that the starting latitude and the ending latitude, or the starting longitude and the ending longitude may be switched with each other as long as an area that contains the company A can be specified. In this example, the area that contains the company A can be specified using the latitudes and the longitudes. Therefore, the user does not have to input the altitudes in the respective input boxes 306 and 307. Upon completing the input of the data in the input boxes 301 to 305, the user presses the "save" button. If the user wants to stop configuring the area information settings, the user presses a "cancel" button. If the user wants to clear the inputted content in the input boxes, the user presses a "clear" button.

Upon the "save" button being pressed, the data on the set area information that has been inputted in the input boxes is transmitted to the data processing unit 131 of the portable medium 100. The data processing unit 131 encrypts the received data on the set area information. Then, the data processing unit 131 stores the encrypted data in the set area information storage area 133. Thus, the area information settings for the company A are configured. The user can also configure the area information settings for the company D in a manner similar to that in the case of the company A. Since the operations for configuring the area information settings for the company D are similar to those in the case of the company A, the description thereof will be omitted.

Figure 6:
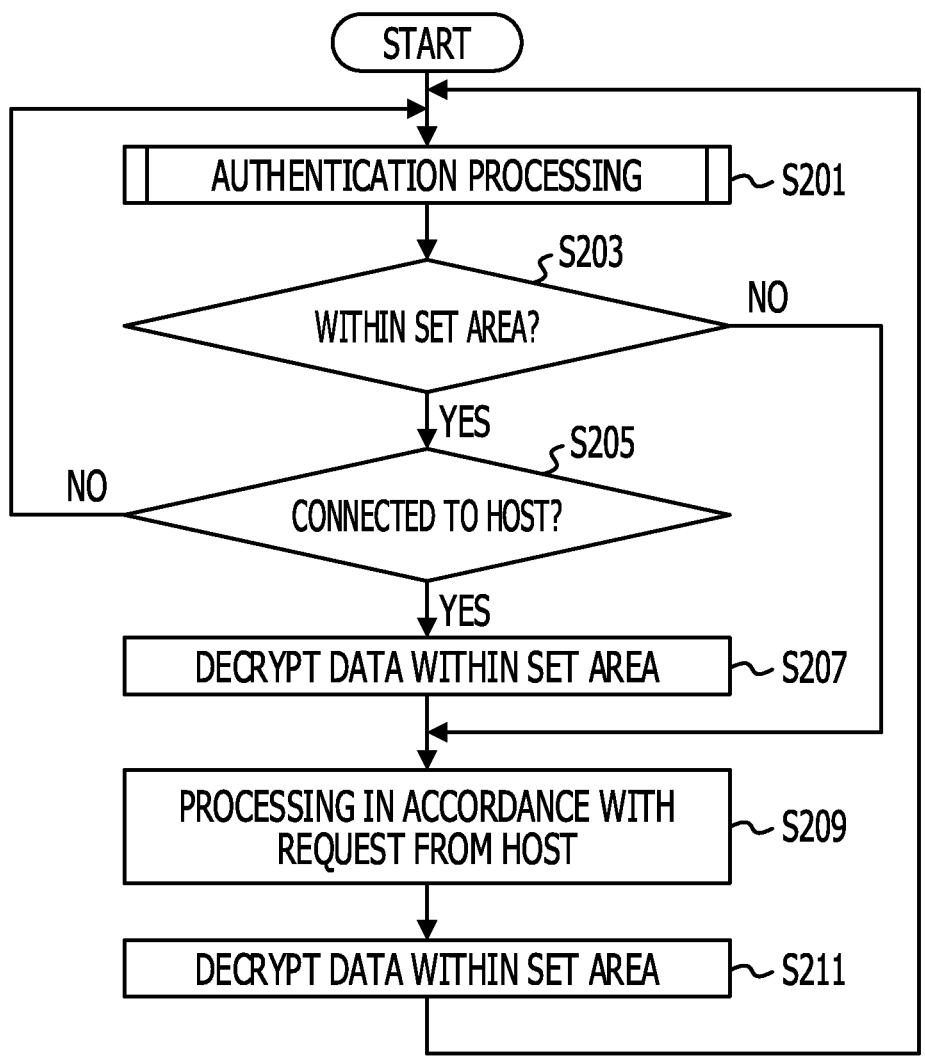
FIG. 6 is a flowchart of processing for implementing a method for protecting data in the portable medium according to the first embodiment.

After configuring the area information settings for the company A, the user visits the company A and carries out maintenance work using the portable medium 100. Here, processes for implementing the protection of data in the portable medium 100 in the first embodiment will be described with reference to flowcharts. For reasons of convenience, a step is abbreviated as S in the following description. FIG. 6 illustrates an overall flow of the processes in the data protection carried out in the portable medium 100. When the portable medium 100 is connected to the PC 200, the power supply to the portable medium 100 is turned on. Further, the main control unit 110 of the portable medium 100 starts the processes in the flowchart. Upon the processes in the flowchart being started, the processing proceeds to S201.

Figure 7:
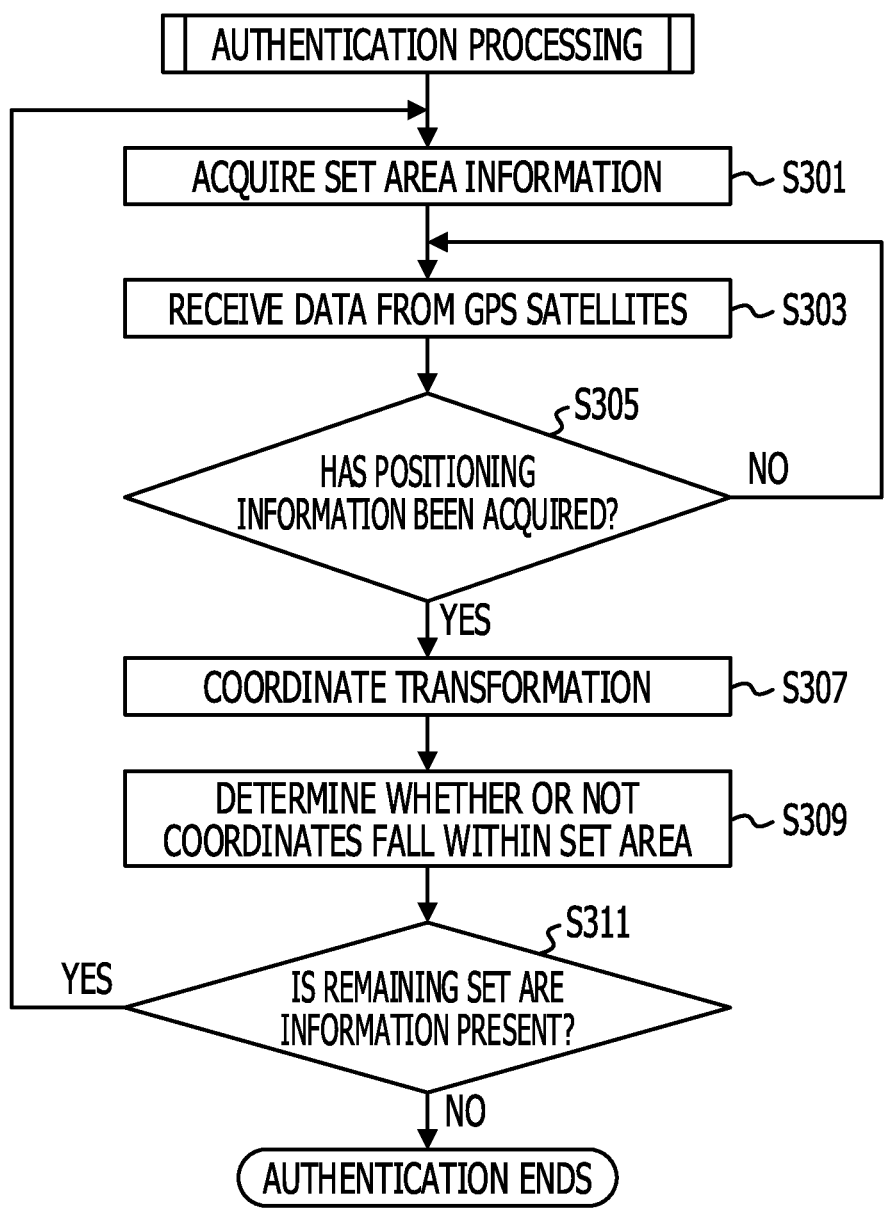
FIG. 7 is a flowchart illustrating a subroutine in the processing for implementing the method for protecting data in the portable medium according to the first embodiment.

In S201, the main control unit 110 carries out authentication processing. FIG. 7 illustrates a flowchart of the authentication processing subroutine to be carried out by the main control unit 110 in S201. In S301, the main control unit 110 acquires set area information stored in the set area information storage area 133. If multiple pieces of set area information are stored in the set area information storage area 133, the main control unit 110 acquires any one of the pieces of the set area information. Then, the processing proceeds to S303.

In S303, the GPS information acquisition unit 121 receives data for acquiring positioning information from a plurality of GPS satellites. The data is received from the GPS satellites through a well-known technique, and thus the detailed description thereof will be omitted. Then, the processing proceeds to S305. In S305, the main control unit 110 determines whether or not the positioning information has been successfully acquired as a result of receiving the data from the GPS satellites in S303. If the positioning information has not been acquired (S305: No), the processing returns to S303, and the main control unit 110 retries receiving of data from the GPS satellites in order to acquire the positioning information. If the positioning information has been acquired successfully (S305: Yes), the processing proceeds to S307.

In S307, the coordinate transformation unit 122 transforms the positioning information acquired from the GPS information acquisition unit 121 into the coordinates of latitude, longitude, and altitude that indicate the current location. Then, the processing proceeds to S309. In S309, the area determination unit 111 determines whether or not the transformed coordinates fall within the area that is indicated by the set area information acquired in S301. Then, the area determination unit 111 generates a flag that indicates the determination result. The generated flag is stored in an area determination table 133a of the set area information storage area 133. If, for example, the coordinates fall within the area, "1" or "true" is set in the flag, and if the coordinates do not fall within the area, "0" or "false" is set in the flag. Note that any desired configuration may be employed, aside from the use of a table or a flag, as long as the configuration allows the determination result to be stored. Then, the processing proceeds to S311.

In S311, the main control unit 110 determines whether or not set area information that has not yet been acquired in S301 is still stored in the set area information storage area 133. If such set area information is present (S311: Yes), the processing returns to S301, and the processes in S303 to S309 are carried out with the remaining set area information. When multiple pieces of set area information are stored in the set area information storage area 133, each flag that is added through the process in S309 is added to the area determination table 133a as a distinct record. Accordingly, the determination result for each piece of the set area information is stored in the area determination table 133a. Meanwhile, if there is no remaining set area information (S311: No), the authentication processing subroutine is terminated, and the processing proceeds to S203 of FIG. 6.

In S203, the main control unit 110 determines whether or not any one of the area determination flags in the area determination table 133a indicates that the coordinates fall within the set area as a result of carrying out the authentication processing subroutine in S201. If any one of the area determination flags indicates that the coordinates fall within the set area (S203: Yes), the processing proceeds to S205. If none of the area determination flags indicate that the coordinates fall within the set area (S203: No), the processing proceeds to S209 without carrying out detection of a connection to the host in S205 and decryption of the data in S207, which will be described later.

In S205, the main control unit 110 determines whether or not the host connection detection unit 123 of the authentication unit 120 has detected that a connection between the portable medium 100 and the PC 200 serving as the host has been established. If the connection detection unit 123 has detected that a connection between the portable medium 100 and the PC 200 has been established (S205: Yes), the processing proceeds to S207. If a connection between the portable medium 100 and the PC 200 has not been established (S205: No), the processing returns to S201, and the authentication processing based on the current location is carried out again.

In S207, the main control unit 110 refers to the area determination flags stored in the area determination table 133a. Then, the main control unit 110 identifies set area information that includes a flag indicating that the coordinates fall within the area. Then, the main control unit 110 decrypts files and folders stored in the data storage area 132 on the basis of the identified set area information. Specifically, the main control unit 110 determines whether or not the data storage latitude 400e, the data storage longitude 400f, and the data storage altitude 400g in the file/folder management information 400 of the files and the folders fall within the area indicated by the identified set area information. Then, if the data storage latitude 400e, the data storage longitude 400f, and the data storage altitude 400g in the file/folder management information 400 fall within the area indicated by the identified set area information, the main control unit 110 decrypts the files and the folders. When the main control unit 110 completes the decryption of the data, the processing proceeds to S209.

In S209, the user operates the PC 200 to carry out various processes such as reading and writing of the decrypted data.

The PC 200 transmits a request to the request processing unit 112 of the main control unit 110 in accordance with each process to be carried out. The request processing unit 112 carries out processing in accordance with the received request.

When the request processing unit 112 creates and stores data in accordance with a request received from the PC 200, the GPS information acquisition unit 121 acquires positioning information from the GPS satellites. Then, the coordinate transformation unit 122 transforms the acquired positioning information into coordinates that indicate the current location. Those processes by the GPS information acquisition unit 121 and the coordinate transformation unit 122 are identical to the processes in S303 to S307 described above, and thus description thereof will be omitted. Then, the request processing unit 112 acquires the coordinates transformed by the coordinate transformation unit 122. Thereafter, the request processing unit 112 updates the data storage latitude 400e, the data storage longitude 400f, and the data storage altitude 400g in the file/folder management information 400 on the data to be processed on the basis of the acquired coordinates. Note that such an update may be made each time some processing is carried out on the data, aside from when the data is created or stored.

When the request processing unit 112 completes the data processing and the update of the file/folder management information 400, the processing proceeds to S211. In S211, the main control unit 110 creates an encryption key and a decryption key and then encrypts the data that has been decrypted in S207 and the data that has been created in S209. The created encryption key and decryption key are stored as the data encryption key 400c and the data decryption key 400d in the file/folder management information 400 on the data to be encrypted. Alternatively, if information on the data encryption key 400c and the data decryption key 400d already exists, such information is updated with the created encryption key and decryption key.

As the data encryption is completed in S211, the processing returns to S201, and the authentication processing, the data decryption, and so on described above are carried out again. Therefore, even if, for example, the user moves away from the company A while the portable medium 100 is kept connected to the PC 200 after completing maintenance work at the company A, once the user moves out of the set area for the company A that is defined by X1, X2, Y2, and Y3 as illustrated in FIG. 4, the area determination flag of the set area information for the company A in the area determination table 133a is set to "0" or "false" as a result of the authentication processing subroutine in S201. Accordingly, the data that has been available in the set area for the company A is not decrypted in S207 and thus becomes unavailable.

Figure 8:
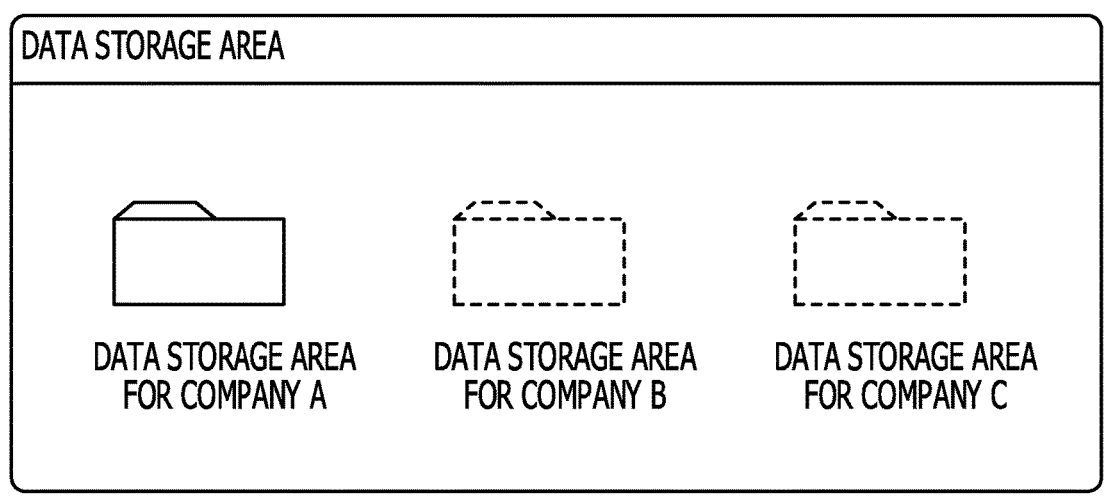
FIG. 8 schematically illustrates data display of the portable medium according to the first embodiment.

FIG. 8 illustrates exemplary display of the decrypted data being displayed on the display unit 201 of the PC 200. The assumption here is that the user has previously carried out maintenance work at the company A, the company B, and the company C. Thus, folders respectively for the company A, the company B, and the company C are already stored in the data storage area 132. That is, in FIG. 8, "data storage area for the company A" is a folder that has been created inside the company A. To be more accurate, "inside the company A" refers to the inside of an area defined by X1, X2, Y2, and Y3. In addition, "outside the company A" refers to an area outside the aforementioned area. The same applies to the cases for the other companies, hereinafter. Thus, "data storage area for the company B" and "data storage area for the company C" are folders that are created, respectively, inside the company B and the company C. For convenience, these two folders are indicated by dotted lines in FIG. 8. In reality, however, these two folders are not displayed in the display unit 201, or even if the two folders are displayed, operations such as opening these folders are disabled.

The user again visits the company A in order to carry out maintenance work. Then, when the user connects the portable medium 100 to the PC 200, the processes in S201, S203, S205, and S207 described above are carried out. FIG. 8 illustrates a display state of the display unit 201 when the processing has proceeded to S209. As illustrated in FIG. 8, in S207, the files and the folders that are created inside the company A are decrypted, as described above. Thus, the user can carry out operations such as reading from and writing to the "data storage area for the company A" folder and the files within that folder. Meanwhile, the user is unable to use the data for the company B or the company C.

In addition, the user can create a new folder or file in the "data storage area for the company A" folder or outside that folder. As described above, the data storage latitude 400e, the data storage longitude 400f, and the data storage altitude 400g based on the coordinates of the current location are appended to the file/folder management information 400 on the created folder or file. Accordingly, similarly to the "data storage area for the company A" folder, the newly created folder or file is also available inside the company A. However, the newly created folder or file is not available outside the company A.

In this manner, in the first embodiment, the user saves, in the portable medium 100, files and folders that have been created inside the company A. Thus, these files and folders become available inside the company A. However, these files and folders are not available outside the company A. Accordingly, leakage of these files and folders outside the company A, that is, inside the company B or the company C, for example, can be suppressed. In addition, the first embodiment allows the user to carry out operations on the data in the portable medium 100 in similar manners to handling data in an existing portable medium. That is, according to the processing of the first embodiment, the data processing unit 131 appends the latitude, the longitude, and the altitude obtained by transforming the positioning information acquired from the GPS satellites to the data storage latitude 400e, the data storage longitude 400f, and the data storage altitude 400g in the file/folder management information 400 through the processing in S105. Then, through the processing in S207, if the data storage latitude 400e, the data storage longitude 400f, and the data storage altitude 400g in the file/folder management information 400 on a file or folder fall within the identified area, the main control unit 110 decrypts that file or folder. Accordingly, the user is not aware of the processing being carried out to append the data storage latitude 400e, the data storage longitude 400f, and the data storage altitude 400g to the files and folders. In addition, the user is not aware of the processing being carried out for determining whether or not the data storage latitude 400e, the data storage longitude 400f, and the data storage altitude 400g that have been appended to the files and folders fall within the area. Accordingly, the data in the portable medium 100 can be protected while the user is not aware of the area determination processing being carried out in the first embodiment.

Since the area in which the data becomes available is defined by the latitudes and the longitudes, the positioning information of the GPS can be used with ease in the data protection method according to the first embodiment. Using the positioning information of the GPS makes it possible to define an area in which the data is available with high precision.

Since the data is protected on the basis of geographical information such as the area information, as long as the data is used within the set area, a problem does not arise even if operations are carried out over a day. That is, if, for example, a maintenance technician is unable to complete repairs of a PC within a given day due to a defect in a replacement part or the like and is to continue with the operation on another day, in an existing technique, prior to carrying a portable medium in which migrated data is stored to the outside of the maintenance work site, the data has to be deleted. However, with the first embodiment, the data migrated in a portable medium at a given location can only be referred to in the given location. Accordingly, the maintenance technician does not have to delete the data migrated in the portable medium when moving away from the maintenance work site.

Further, in an existing technique, operation procedures are often employed in which, after the completion of maintenance work, the entire data related to the maintenance work is deleted from the portable medium. However, the first embodiment allows the data stored in the portable medium to be kept safely. Thus, the data can be retained in the portable medium even after the maintenance work ends, and if the user is to use the data that has been used in the maintenance work again for analysis work or the like on a later day, the user can handle such a situation flexibly.

The first embodiment has been described thus far. The configuration of the data protection system 1 is not limited to the one described in the embodiment above, and various modifications can be made without departing from the technical spirit of the present disclosure. For example, the power is supplied to the portable medium 100 from the PC 200 serving as the host to which the portable medium 100 is connected in the first embodiment. Alternatively, the portable medium 100 may include an internal power supply, and each unit in the portable medium 100 may operate on the internal power supply even when the portable medium 100 is disconnected from the PC 200. Then, by completing the authentication processing prior to the portable medium 100 being connected to the PC 200, the time it takes for the data to become available after the portable medium 100 is connected to the PC 200 can be reduced.

In the preceding description, the information obtained by transforming the positioning information acquired from the GPS satellites into the coordinates has served as the information that indicates the current location of the portable medium 100. Alternatively, in place of or in addition to using the GPS, a mechanism that identifies the current location on the basis of communication with a base station for mobile telephones may be provided in the portable medium 100. Then, even when the user carries out maintenance work in an environment in which communication with a GPS satellite is unable to be established, information that indicates the current location of the portable medium 100 can be acquired.

Figure 9:
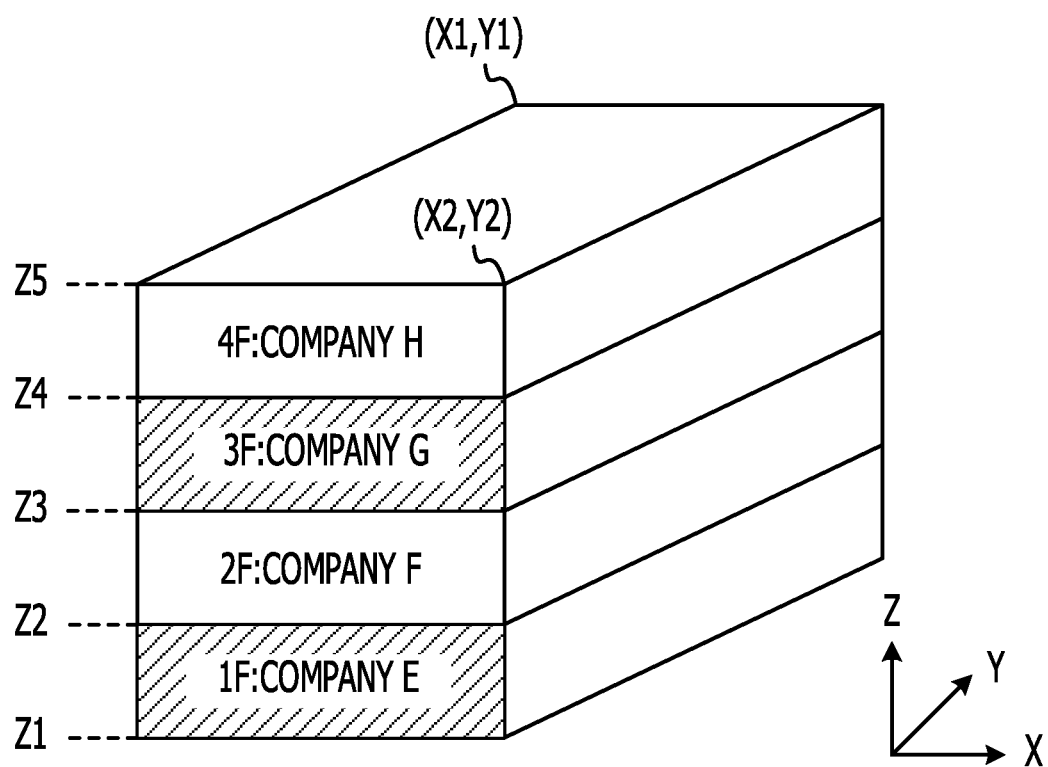
FIG. 9 is a three-dimensional map for describing area information settings in a second embodiment.

In the preceding description, for example, the area has been defined using the two-dimensional orthogonal coordinates in configuring the area information settings as illustrated in FIG. 4. Alternatively, any given method and coordinate system can be used as long as the given method and coordinate system allow a two-dimensional area to be defined. Furthermore, the area can also be set with the altitude taken into consideration. FIG. 9 illustrates an example of area information settings in three-dimensional orthogonal coordinates of XYZ coordinates in a second embodiment. As illustrated in FIG. 9, an X-axis, a Y-axis, and a Z-axis that are orthogonal to one another are set. Here, the X-coordinate indicates the longitude, the Y-coordinate indicates the latitude, and the Z-coordinate indicates the altitude. As illustrated in FIG. 9, a building in which companies E to H are located, respectively, in the first to fourth floors is assumed. Then, the user is to carry out maintenance work in the company E and the company G. In the second embodiment, points in the area settings that differ from those of the first embodiment will be described. The remaining points are similar to those of the first embodiment, and thus description thereof will be omitted.

In the second embodiment, the user uses the area information setting dialog box 300 to configure the area settings for the company E and the company G. In FIG. 9, the space which the company E occupies is identified by a longitude range defined by X1 and X2, a latitude range defined by Y1 and Y2, and an altitude range defined by Z1 and Z2. Thus, the user inputs in the area name input box 301 of the area information setting dialog box 300, for example, an area name such as "data storage area for the company E" to indicate that the set area is for the company E. In addition, the user inputs in the area information input boxes 302 to 307 the values of the starting latitude at Y1, the ending latitude as Y2, the starting longitude as X1, the ending longitude as X2, the starting altitude as Z1, and the ending altitude as Z2. Note that the inputted values in X1 and X2, Y1 and Y2, and Z1 and Z2 may be switched with each other. Upon completing the input of the data in the input boxes 301 to 307, the user presses the "save" button. Thus, the set area information for the company E is stored in the set area information storage area 133.

Subsequently, the user configures the area settings for the company G. In FIG. 9, the space which the company G occupies is identified by a longitude range defined by X1 and X2, a latitude range defined by Y1 and Y2, and an altitude range defined by Z3 and Z4. The user inputs in the input boxes 301 to 307 an area name and the values of the respective coordinates to indicate that the set area is for the company G and then presses the "save" button. Thus, the set area information for the company G is stored in the set area information storage area 133.

As described above in the first embodiment, the positioning information acquired in S305 also includes information on the altitude. Thus, the coordinates into which the positioning information is transformed in S307 indicate the latitude, the longitude, and the altitude. Accordingly, in the second embodiment, in S309, the area determination unit 111 determines whether or not the current location falls within the set area with the latitude, the longitude, and the altitude taken into consideration. Thus, the area determination unit 111 can make a determination with high precision while distinguishing between the company E and the company G that have the same latitude and longitude but different altitudes. Then, the data created inside the company E is available inside the company E and is unavailable outside the company E. Similarly, the data created inside the company G is available inside the company G and is unavailable outside the company G. Note that the display of the files and folders created respectively for the company E and the company G is similar to that illustrated in FIG. 8, and thus the depiction and description thereof will be omitted.

Computer Readable Recording Medium

A program that causes a computer, a machine, a device, or the like (hereinafter, the computer) to implement any one of the functions described above can be recorded on a computer readable recording medium. Then, such a function can be provided by loading the program in the recording medium onto the computer and causing the computer to execute the program. Here, the computer corresponds to, for example, the control unit 20 of the portable medium 100.

Here, the computer readable recording medium refers to a recording medium that can accumulate information such as data and programs through an electrical, magnetic, optical, mechanical, or chemical action and that can be read by the computer. Examples of such a recording medium that is removable from the computer include a flexible disk, a magneto-optical disk, a CD-ROM, a CD-R/W, a DVD, a Blu-ray Disc, a DAT, an 8-mm tape, and a memory card such as a flash memory. Further, examples of such a recording medium that is mounted to the computer include a hard disk drive and a ROM.

The storage device, the method for protecting data on the storage device, and the program according to the embodiments described above can be used to temporarily migrate data that is stored in a PC or to restore the migrated data when carrying out maintenance work on a client's information processing device or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A portable storage device, comprising:
    an interface circuit configured to receive an access from a host machine;
    a memory including
       a first storage area configured to store area information that indicates a geographical area in which data is available to be accessed, and
       a second storage area separated from the first storage area and configured to store data separated from the area information; and
    a processor coupled to the memory and the interface circuit,
    wherein the processor is configured to:
    execute an input process that includes
       receiving data from the host machine through the interface circuit,
       appending data storage information to at least a piece of the data received from the host machine, the data storage information being separated from the area information and including coordinate values that correspond to a location of the portable storage device at a time when the data storage information is appended to the data, and
       storing the data associated with the storage information in the second storage area; and
    execute, when the portable storage device is reconnected to the host machine through the interface circuit, an output process that includes
       obtaining a current location of the portable storage device,
       determining whether the current location is within the geographical area indicated by the area information stored in the first storage area,
       determining, in response to the current location being within the geographical area indicated by the area information, whether a piece of the data stored in the second storage area is associated with the data storage information in which the coordinate values included in the data storage information associated with the piece of the data are within the geographical area indicated by the area information, and
       allowing the piece of the data stored in the second storage area to become available for an operation by the host machine in response to the coordinate values included in the data storage information associated with the piece of the data being within the geographical area indicated by the area information.

2. The portable storage device according to claim 1,
    wherein the area information and the data storage information each include information that indicates a latitude and a longitude, and
    wherein the processor is configured to determine whether or not the portable storage device is located within the geographical area indicated by the area information on the basis of the latitude and the longitude included in the area information and the data storage information.

3. The portable storage device according to claim 2,
    wherein the area information and the data storage information each further include information that indicates an altitude, and
    wherein the processor is configured to determine whether or not the portable storage device is located within the geographical area indicated by the area information on the basis of the latitude, the longitude, and the altitude included in the area information and the data storage information.

4. The portable storage device according to claim 1, wherein:
    the processor is configured to cause the host device to display an icon related to the piece associated with the data storage information that includes the coordinate values that are within the geographical area indicated by the area information, and
    the processor is configured to cause the host device not to display an icon related to a piece of data associated with data storage information that includes coordinate values that are outside the geographical area indicated by the area information.

5. The portable storage device according to claim 1, wherein:
    the second storage area is configured to store a plurality of files as the data,
    the processor is configured to append the data storage information to every file to be stored in the second storage area, and
    the processor is configured to allow one or more specific files from among the plurality of files stored in the second storage area to be available while a current location of the portable storage device is within the geographical area indicated by the area information based on the one or more specific files being associated with data storage information that includes the coordinate values that are within the geographical area indicated by the area information.

6. The portable storage device according to claim 5, wherein:
    the processor is configured to identify, based on a current location of the portable storage device, specific area information from among the area information stored in the first storage area, the specific area information including an area in which the current location of the portable storage device falls, and the processor is configured to allow one or more specific files from among the plurality of files stored in the second storage area to be available while the current location of the portable storage device is within a specific geographical area indicated in the specific area information based on the one or more specific files being associated with data storage information that includes coordinate values which fall within the specific geographical area indicated by the specific area information.

7. A method for protecting data in a portable storage device, the method comprising:

storing area information in a first storage area of the portable storage device, the area information indicating a geographical area in which data is available to be accessed;

executing, by the portable storage device, an input process that includes:

receiving, at the portable storage device, data from a host machine through an interface circuit of the portable storage device;

appending data storage information to the data received from the host machine when the data is stored in a second storage area of the portable storage device in which the second storage area is separated from the first storage area such that the data storage information is separated from the area information, the data storage information including coordinate values that correspond to a location of the portable storage device at a time when the data storage information is appended to the data; and executing, by the portable storage device when the portable storage device is reconnected to the host machine through the interface circuit, an output process that includes:

obtaining a current location of the portable storage device;

determining whether the current location is within the geographical area indicated by the area information stored in the first storage area;

determining, in response to the current location being within the geographical area indicated by the area information, whether a piece of the data stored in the second storage area is associated with the data storage information in which the coordinate values included in the data storage information associated with the piece of the data are within the geographical area indicated by the area information; and allowing the piece of the data stored in the second storage area to become available for an operation by the host machine in response to the coordinate values included in the data storage information associated with the piece of the data being within the geographical area indicated by the area information.

8. The method for protecting data in the portable storage device according to claim 7, wherein the area information and the data storage information each include information that indicates a latitude and a longitude, and wherein the allowing includes determining whether or not the portable storage device is located within the geographical area indicated by the area information on the basis of the latitude and the longitude included in the area information and the data storage information.

9. The method for protecting data in the portable storage device according to claim 8, wherein the area information and the data storage information each further include information that indicates an altitude, and wherein the allowing includes determining whether or not the portable storage device is located within the geographical area indicated by the area information on the basis of the latitude, the longitude, and the altitude included in the area information and the data storage information.

10. A non-transitory machine readable medium storing a program that, when executed by one or more processors, causes a portable storage device to perform operations comprising:

storing area information in a first storage area of the portable storage device, the area information indicating a geographical area in which data is available to be accessed;

executing, by the portable storage device, an input process that includes:

receiving, at the portable storage device, data from a host machine through an interface circuit of the portable storage device;

appending data storage information to the data received from the host machine when the data is stored in a second storage area of the portable storage device in which the second storage area is separated from the first storage area such that the data storage information is separated from the area information, the data storage information including coordinate values that correspond to a location of the portable storage device at a time when the data storage information is appended to the data; and executing, by the portable storage device when the portable storage device is reconnected to the host machine through the interface circuit, an output process that includes:

obtaining a current location of the portable storage device;

determining whether the current location is within the geographical area indicated by the area information stored in the first storage area;

determining, in response to the current location being within the geographical area indicated by the area information, whether a piece of the data stored in the second storage area is associated with the data storage information in which the coordinate values included in the data storage information associated with the piece of the data are within the geographical area indicated by the area information; and allowing the piece of the data stored in the second storage area to become available for an operation by the host machine in response to the coordinate values included in the data storage information associated with the piece of the data being within the geographical area indicated by the area information.

11. The non-transitory machine readable medium storing a program according to claim 10, wherein the area information and the data storage information each include information that indicates a latitude and a longitude, and wherein the allowing includes determining whether or not the portable storage device is located within the geographical area indicated by the area information on the basis of the latitude and the longitude included in the area information and the data storage information.

12. The non-transitory machine readable medium storing a program according to claim 11,
  wherein the area information and the data storage information each further include information that indicates an altitude, and
  wherein the allowing includes determining whether or not the portable storage device is located within the geographical area indicated by the area information on the basis of the latitude, the longitude, and the altitude included in the area information and the data storage information.

* * * * *